US012676832B2

(12) United States Patent
Gomez

(10) Patent No.: US 12,676,832 B2
(45) Date of Patent: Jul. 7, 2026

(54) INTELLIGENT DYNAMIC SECURITY PROFILES FOR WEB APPLICATION FIREWALLS

(71) Applicant: Zscaler, Inc., San Jose, CA (US)

(72) Inventor: Juan C. Gomez, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 65 days.

(21) Appl. No.: 18/939,929

(22) Filed: Nov. 7, 2024

(65) Prior Publication Data
US 2026/0129024 A1     May 7, 2026

(51) Int. Cl.
*G06F 21/00*     (2013.01)
*H04L 9/40*      (2022.01)

(52) U.S. Cl.
CPC ...... *H04L 63/0245* (2013.01); *H04L 63/1416* (2013.01)

(58) Field of Classification Search
CPC ........................ H04L 63/0245; H04L 63/1416
See application file for complete search history.

(56) References Cited

U.S. PATENT DOCUMENTS

| 7,395,187 B2 | 7/2008 | Duyanovich et al. |
| 7,484,122 B2 | 1/2009 | Natarajan et al. |

| 7,526,552 B2 | 4/2009 | Gomez et al. | |
| 7,673,189 B2 | 3/2010 | Duyanovich et al. | |
| 10,229,009 B2 | 3/2019 | Muth et al. | |
| 11,792,162 B1 * | 10/2023 | Grover ................ | H04L 63/1416 726/1 |
| 2023/0135755 A1 * | 5/2023 | Nakar ................... | H04L 63/168 726/11 |
| 2023/0144836 A1 * | 5/2023 | Nakar ................. | H04L 63/1416 726/13 |
| 2023/0370495 A1 * | 11/2023 | Desai ................... | H04L 63/1425 |
| 2025/0193151 A1 * | 6/2025 | Kumar ................ | H04L 67/1008 |
| 2025/0317466 A1 * | 10/2025 | Fry ......................... | H04L 41/16 |

* cited by examiner

*Primary Examiner* — William A Corum, Jr.
(74) *Attorney, Agent, or Firm* — Baratta Law PLLC; Lawrence A. Baratta, Jr.

(57) ABSTRACT

Systems and methods for intelligent dynamic security profiles for Web Application Firewalls (WAFs) include receiving raw data related to operation of a plurality of Web Application Firewall (WAF) agents, wherein the plurality of WAF agents are distributed across multiple tenants globally over the Internet; normalizing and sanitizing the raw data; analyzing the normalized and sanitized data with a machine learning algorithm to determine prioritization of rules in a given WAF agent based on the raw data and an objective; and providing a security profile to the given WAF agent where the security profile includes a selection of the rules based on the prioritization and the objective.

17 Claims, 11 Drawing Sheets

FIG. 9

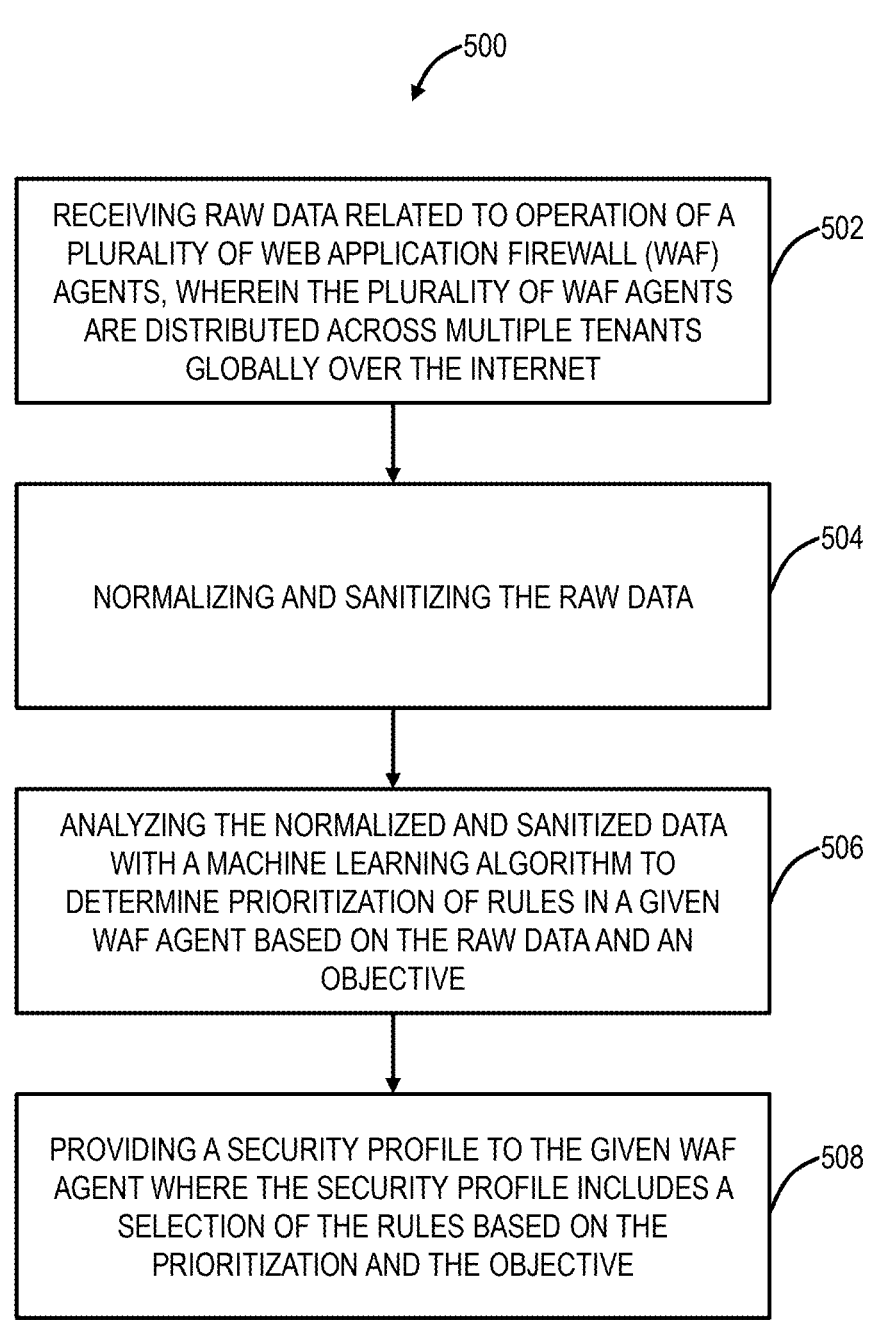

─500

RECEIVING RAW DATA RELATED TO OPERATION OF A PLURALITY OF WEB APPLICATION FIREWALL (WAF) AGENTS, WHEREIN THE PLURALITY OF WAF AGENTS ARE DISTRIBUTED ACROSS MULTIPLE TENANTS GLOBALLY OVER THE INTERNET ─502

NORMALIZING AND SANITIZING THE RAW DATA ─504

ANALYZING THE NORMALIZED AND SANITIZED DATA WITH A MACHINE LEARNING ALGORITHM TO DETERMINE PRIORITIZATION OF RULES IN A GIVEN WAF AGENT BASED ON THE RAW DATA AND AN OBJECTIVE ─506

PROVIDING A SECURITY PROFILE TO THE GIVEN WAF AGENT WHERE THE SECURITY PROFILE INCLUDES A SELECTION OF THE RULES BASED ON THE PRIORITIZATION AND THE OBJECTIVE ─508

FIG. 12

INTELLIGENT DYNAMIC SECURITY PROFILES FOR WEB APPLICATION FIREWALLS

FIELD OF THE DISCLOSURE

The present disclosure generally relates to network and cloud security. More particularly, the present disclosure relates to systems and methods for intelligent dynamic security profiles for Web Application Firewalls (WAFs).

BACKGROUND OF THE DISCLOSURE

A Web Application Firewall (WAF) is a security system that protects web applications by monitoring and filtering Hypertext Transfer Protocol (HTTP) and HTTP Secure (HTTPS) traffic to prevent attacks like Structured Query Language (SQL) injection and cross-site scripting. Operating at the application layer (Layer 7), WAFs can be deployed in network-based, host-based, or cloud-based configurations. While essential for web security, WAFs face challenges such as false positives and negatives, performance impacts, complex rule management, and susceptibility to advanced evasion techniques and zero-day vulnerabilities. Additionally, inspecting encrypted traffic can complicate deployment and raise privacy concerns. To be effective, WAFs require careful configuration, regular updates, and integration with other security measures. Traditionally, WAF solutions use static security profiles that apply pattern-matching rules to web traffic for protection. While adding more rules increases security, it also requires more resources and causes higher inspection delays. Optimizing a security profile to balance maximum protection with minimal resource use and latency is a complex problem, and the ideal profile changes daily.

BRIEF SUMMARY OF THE DISCLOSURE

The present disclosure relates to systems and methods for intelligent dynamic security profiles for Web Application Firewalls (WAFs). The intelligent dynamic security profiles are determined by a machine learning process that leverages global data generated by WAF agents distributed across a large number of tenants and distributed globally over the Internet. As such, the intelligent dynamic security profiles are improved compared to statically configured policies. These may be considered to be optimized based on the current global data and the associated risks on the Internet, to use minimal resources, minimal latency, and maximal threat detection, in terms of WAF agent processing. Cyber-security is always a trade off between user experience and threat detection—it is possible to detect almost every threat, but the latency and compute resources lead to poor user experience. Conversely, minimizing the processing improves latency and user experience, but leads to missed threats. The approach described herein removes user configuration from determining the ideal security profiles and leverages real-world data to automatically configure such policies given the current state of threats.

In various embodiments, the present disclosure includes a method having steps, a processing device configured to implement the steps, a cloud-based system configured to implement the steps, and as a non-transitory computer-readable medium storing instructions for programming one or more processors to execute the steps. The steps include receiving raw data related to operation of a plurality of Web Application Firewall (WAF) agents, wherein the plurality of WAF agents are distributed across multiple tenants globally over the Internet; normalizing and sanitizing the raw data; analyzing the normalized and sanitized data with a machine learning algorithm to determine prioritization of rules in a given WAF agent based on the raw data and an objective; and providing a security profile to the given WAF agent where the security profile includes a selection of the rules based on the prioritization and the objective.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 6-11 are screenshots associated with a centralized WAF management platform for configuring WAF security profiles for the WAF agents.

FIG. 12 illustrates a flowchart of a process for intelligent dynamic security profiles for Web Application Firewalls.

DETAILED DESCRIPTION OF THE DISCLOSURE

Again, the present disclosure relates to systems and methods for intelligent dynamic security profiles for Web Application Firewalls (WAFs) that are continuously generated and updated using machine learning and artificial intelligence techniques. As such, WAF agents, whether network-based, host-based, or cloud-based, always have optimized settings for the application of security profiles. To that end, this removes manual configuration and updates, using minimal resources, having minimal latency, and providing maximal threat detection, in terms of WAF agent processing. This is accomplished by leveraging global threat monitoring data for WAF rules and continuously updating based thereon.

§ 1.0 Cybersecurity Monitoring and Protection Examples

Figure 1:
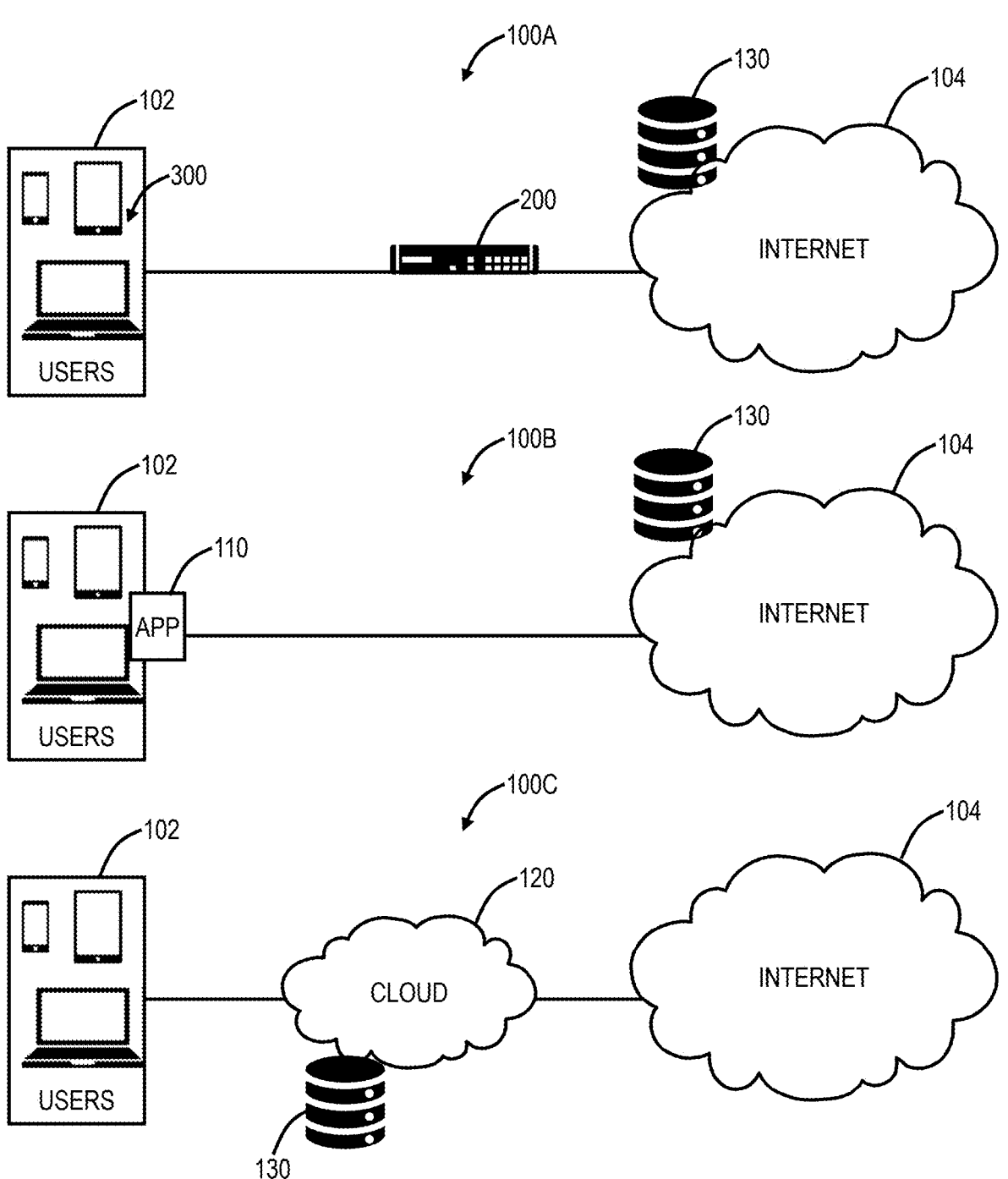
FIG. 1 illustrates a network diagram of three example network configurations of cybersecurity monitoring and protection of a user.
Figure 3:
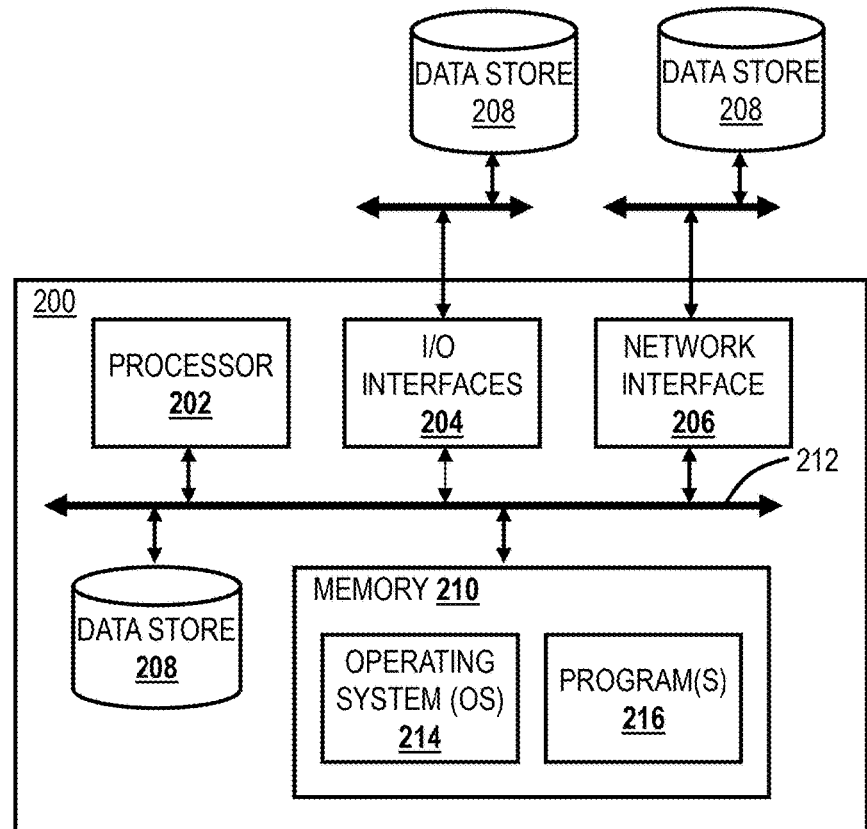
FIG. 3 illustrates a block diagram of a server.

FIG. 1 illustrates a network diagram of three example network configurations 100A, 100B, 100C of cybersecurity monitoring and protection of an endpoint 102. Those skilled in the art will recognize these are some examples for illustration purposes, there may be other approaches to cybersecurity monitoring (as well as providing generalized services), and these various approaches can be used in combination with one another as well as individually. Also, while shown for a single endpoint 102, practical embodiments will handle a large volume of endpoints 102, including multi-tenancy, i.e., users on the endpoints 102 for different tenants, companies, organizations, etc., In this example, the endpoint 102 communicates on the Internet 104, including accessing cloud services, Software-as-a-Service, Web resources, and other resources or services (each may be offered via computing resources, such as, e.g., using one or more servers 200 as illustrated in FIG. 3).

Note, the term endpoint 102 is used herein to refer to any computing device (see FIG. 4 for an example computing device 300) which can communicate on a network, the Internet 104, etc. The endpoint 102 can be associated with a user and include laptops, tablets, mobile phones, desktops, etc. Further, the endpoint can also mean machines, workloads, Internet-of-Things (IoT) devices, or simply anything that connects to the Internet 104 as well as other networks. That is, the endpoints 102 is any networked device.

As part of offering cybersecurity through these example network configurations 100A, 100B, 100C, there is a large amount of cybersecurity data obtained. Various embodiments of the present disclosure focus on using this cybersecurity data along with a customer's data to perform various security tasks including developing customer machine learning models and other security platforms of the like.

The network configuration 100A includes a server 200 located between the endpoint 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located inline with the endpoint 102 and configured to monitor the endpoint 102. In other embodiments, the server 200 does not have to be inline. For example, the server 200 can monitor requests from the endpoint 102 and responses to the endpoint 102 for one or more security purposes, as well as allow, block, warn, and log such requests and responses. The server 200 can be on a local network associated with the endpoint 102 as well as external, such as on the Internet 104. Also, while described as a server 200, this can also be a router, switch, appliance, virtual machine, etc. The network configuration 100B includes an application 110 that is executed on the computing device 300. The application 110 can perform similar functionality as the server 200, as well as coordinated functionality with the server 200 (a combination of the network configurations 100A, 100B). Finally, the network configuration 100C includes a cloud service 120 configured to monitor the endpoint 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other cybersecurity techniques. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the endpoints 102, using signatures sourced and constantly updated. The DNS security can identify and route command-and-control connections to threat detection engines for full content inspection. The DLP can use standard and/or custom dictionaries to continuously monitor the endpoints 102, including compressed and/or Transport Layer Security (TLS) or Secure Sockets Layer (SSL)-encrypted traffic as well as other types of encrypted traffic.

In typical embodiments, the network configurations 100A, 100B, 100C can be multi-tenant and can service a large volume of the endpoints 102. Newly discovered threats can be promulgated for all tenants practically instantaneously. The endpoints 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of endpoints 102 under management by an IT group, department, administrator, etc., i.e., some group of endpoints 102 that are managed together. One advantage of multi-tenancy is the visibility of cybersecurity threats across a large number of endpoints 102, across many different organizations, across the globe, etc. This provides a large volume of data to analyze, use machine learning techniques on, develop comparisons, etc. The present disclosure can use the term "service provider" to denote an entity providing the cybersecurity monitoring and a "customer" as a company (or any other grouping of endpoints 102).

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own endpoints 102 and configuration, policy, rules, etc. Also, cybersecurity offerings tend to be siloed or categorized into different categories, e.g., SWG, SASE, SSE, etc. Also, new categories are constantly being created and used. Those skilled in the art will recognize these are presented for illustration purposes and are not limiting, and the present disclosure contemplates any cybersecurity monitoring approach.

§ 1.1 Cloud Monitoring

The cloud 120 can scale cybersecurity monitoring and protection with near-zero latency on the endpoints 102. Also, the cloud 120 in the network configuration 100C can be used with or without the application 110 in the network configuration 100B and the server 200 in the network configuration 100A. Logically, the cloud 120 can be viewed as an overlay network between endpoints 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the endpoints 102, as well as independent of platform, operating system, network access technique, network access provider, etc.

There are various techniques to forward traffic between the endpoints 102 and the cloud 120. A key aspect of the cloud 120 (as well as the other network configurations 100A, 100B) is that all traffic between the endpoints 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud or SaaS services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

§ 1.2 Zero Trust

Figure 2:
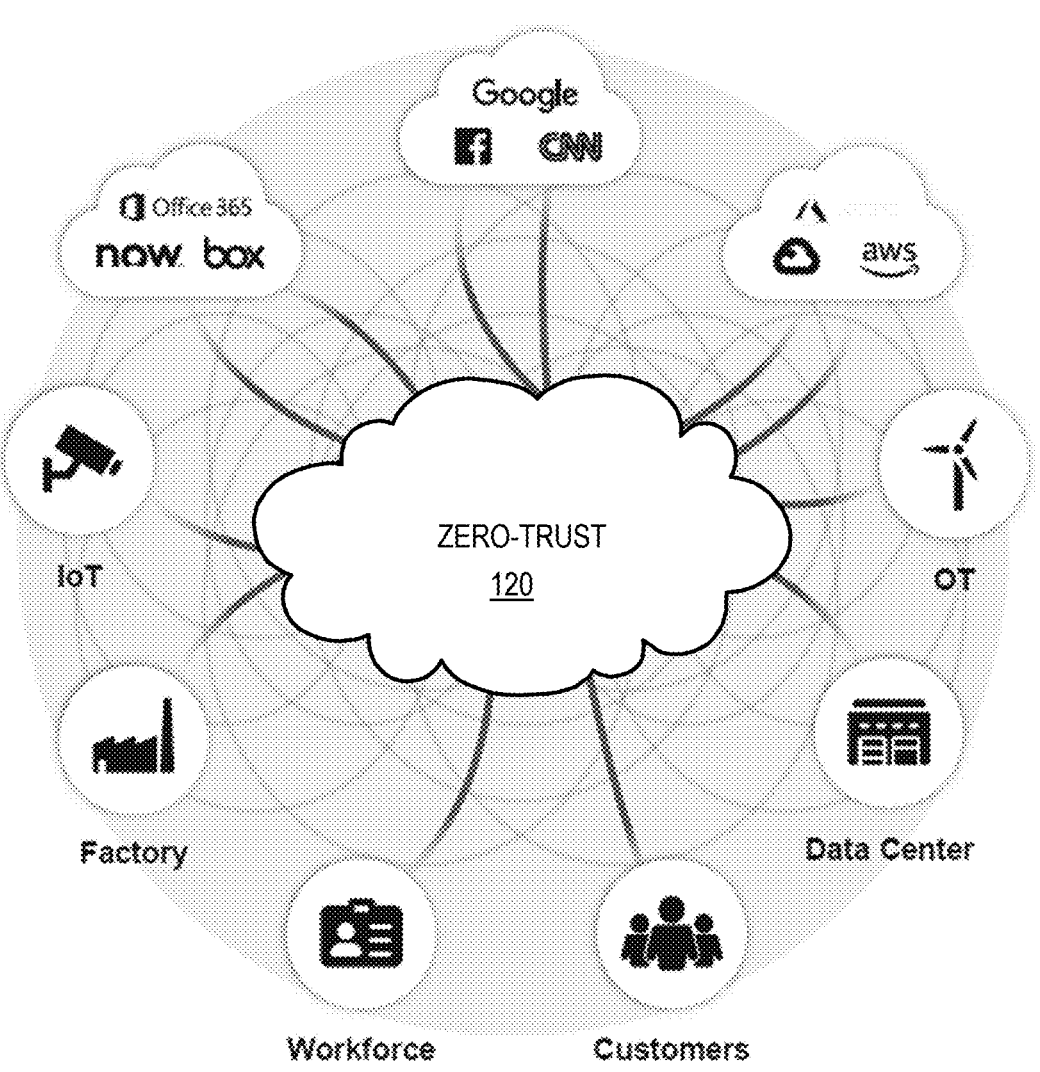
FIG. 2 illustrates a logical diagram of the cloud operating as a zero-trust platform.

FIG. 2 illustrates a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120. Zero trust is a cybersecurity strategy where security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multi-factor authentication (MFA) approaches beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

§ 2.0 Example Server Architecture

FIG. 3 illustrates a block diagram of a server 200, which may be used as a destination on the Internet 104, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc..

§ 3.0 Example Computing Device Architecture

Figure 4:
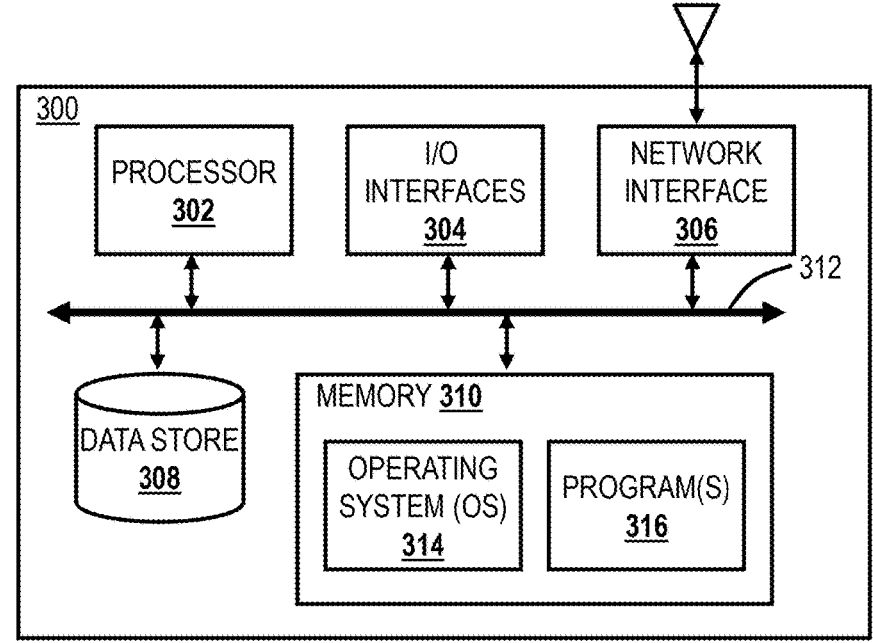
FIG. 4 illustrates a block diagram of a computing device.

FIG. 4 illustrates a block diagram of a computing device 300, which may realize an endpoint 102. Specifically, the computing device 300 can form a device used by one of the endpoints 102, and this may include common devices such as laptops, smartphones, tablets, netbooks, personal digital assistants, cell phones, e-book readers, IoT devices, servers, desktops, printers, televisions, streaming media devices, storage devices, and the like, i.e., anything that can communicate on a network. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables communication to an external access device or network. Any number of suitable data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 4, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the computing device 300.

§ 4.0 WAF

Figure 5:
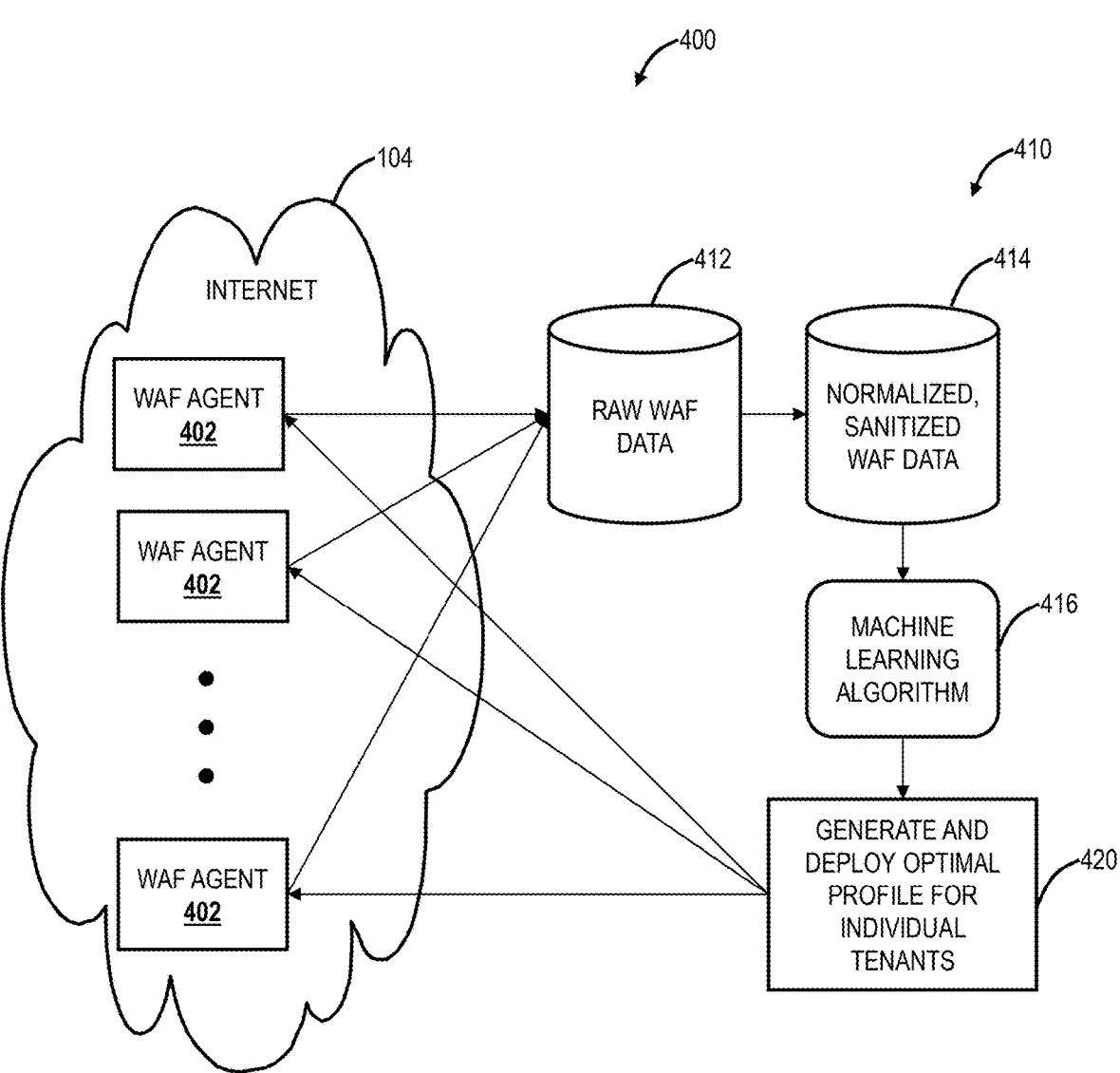
FIG. 5 illustrates a network diagram of a network including a plurality of WAF agents communicatively coupled to a WAF security profile generation system.

FIG. 5 illustrates a network diagram of a network 400 including a plurality of WAF agents 402 communicatively coupled to a WAF security profile generation system 410. Each WAF agent 402 is a software component that is deployed on a server 200, computing device 300, or part of an application to help enforce security profiles or policies, protect against web-based threats, and monitor traffic at the application layer (Layer 7 of the OSI model). The agent works in conjunction with WAF security profile generation system 410 to provide real-time protection and threat mitigation for web applications. The WAF agents 402 can be network-based, host-based, or cloud-based, and they are distributed such as on the Internet 104, across a geography or even globally, with different users, on different endpoints 102, with different associated tenants. There can be a large number of WAF agents 402 covering a large geography, thereby providing real-time intelligence of the active threats in a given location.

§ 4.1 Components and Functions of a WAF Agent (1) Traffic Monitoring—The WAF agent 402 monitors incoming and outgoing HTTP/HTTPS traffic to and from the web application. It inspects all traffic at the application layer for malicious patterns, attack signatures, or anomalies. The agent 402 operates in real-time, meaning it can analyze traffic dynamically and block malicious requests before they reach the application.

(2) Request Filtering—The WAF agent 402 can block or allow requests based on URL patterns. For example, it can block access to certain endpoints or resources. The WAF agent 402 can filter and sanitize input fields to protect against SQL injection, cross-site scripting (XSS), and other common web vulnerabilities by checking if inputs match malicious patterns. Also, the WAF agent 402 ensures that file uploads do not contain malicious content, such as malware or scripts.

(3) Threat Detection—The WAF agent 402 uses a set of predefined security rules or threat signatures to detect specific attacks, such as buffer overflow, remote code execution, or cross-site request forgery (CSRF). The WAF agent 402 can also use anomaly detection techniques to recognize abnormal patterns in traffic, such as an unusual number of requests or strange user-agent strings, which might indicate an attack or a bot.

(4) Application Performance and Resource Monitoring—The WAF agent 402 monitors the performance of the web application and the consumption of server resources. If an attack, like a DDoS (Distributed Denial of Service), is consuming too many resources, the agent can respond by rate-limiting traffic or blocking requests. It ensures that the security mechanisms in place do not overly impact the application's performance, optimizing the balance between security and efficiency.

(5) Traffic Encryption and Decryption (SSL/TLS Inspection)—The WAF agents 402 can be equipped to inspect encrypted traffic (HTTPS) by decrypting it, analyzing the content, and then re-encrypting the data before forwarding it to the application server. This ensures that attackers cannot hide malicious activities inside encrypted traffic, making the WAF agent 402 effective even for sites that require secure communication.

(6) Logging and Reporting—The WAF agent 402 logs all activities, including blocked requests, suspicious behavior, and overall traffic trends. These logs are essential for auditing, incident response, and forensics. The WAF agent 402 can also send real-time alerts or logs to a centralized WAF management platform including the WAF security profile generation system 410 or a Security Information and Event Management (SIEM) system for further analysis. The WAF agents 402 provides associated data to the WAF security profile generation system 410 as raw WAF data 412. The raw WAF data 412 can include transaction data, time and location, violated rule, user data (information about the endpoint 102, the user, the corresponding tenant, etc.), and the like.

(7) Integration with Other Security Tools—The WAF agent 402 is often part of a broader security architecture and integrates with other security tools, such as Intrusion Prevention Systems (IPS), SIEM, or endpoint protection platforms. This integration allows for more comprehensive protection by correlating web traffic security events with other security alerts across the organization.

(8) Customizable Security Policies—The WAF agent 402 allows for the creation of custom security policies based on the specific needs of the application or business. These policies may address particular vulnerabilities, compliance requirements, or user roles. It can be configured to operate in blocking mode (actively blocking malicious traffic) or monitoring mode (only logging and alerting on suspicious activity for manual review).

§ 4.2 WAF Security Profiles

The WAF agent 402 applies various security rules to detect and block malicious traffic that targets web applications. One of the key components of how the WAF agent 402 operates is through security profiles, which define the specific set of rules or patterns that the agent uses to inspect and filter web traffic. Security profiles refer to pre-configured, fixed sets of rules and patterns that are applied by the WAF agent 402 to detect known vulnerabilities, attacks, and malicious behaviors. These profiles include predefined security policies that cover a wide range of common web-based threats. They are designed to provide consistent and immediate protection without requiring real-time customization or learning.

Again, the traditional approach is for static security profiles where the specific rules are selected for application. Also, again, the more rules we apply to a given traffic, the safer we are but the more resources we need for inspecting traffic and the higher the inspection delay added to traffic. Selecting the security profile that maximizes security and minimizes inspection latency and inspection resources is an optimization problem. Furthermore, the optimal profile evolves on a daily basis.

Security profiles contain various types of rules that are designed to match known malicious patterns in web traffic. Here are the main types of pattern-matching rules that a static profile typically includes:

(1) Signature-based Rules—These rules are based on known attack signatures, which are patterns of malicious traffic that have been observed in the past. For example, a signature for a SQL injection attack might match specific patterns in the URL or input fields, such as the use of certain SQL keywords (SELECT, DROP, - - -, etc.) in a suspicious context. Signature-based detection is effective for blocking well-known attacks.

(2) Regular Expression (Regex) Matching—Static profiles often use regular expressions to search for specific patterns within HTTP requests and responses. For example, a regex could be designed to match potential cross-site scripting (XSS) payloads, looking for patterns such as <script> tags in input fields. Regex allows for flexible and precise matching, enabling the detection of a wide variety of attack types.

(3) URL Filtering Rules—These rules filter traffic based on specific URL patterns, such as blocking access to sensitive administrative endpoints (/admin, /login) or disallowing access to certain file types (e.g., .exe, .bat). URL filtering can prevent attackers from accessing unauthorized areas of a website or launching brute-force attacks on login pages.

(4) HTTP Method Filtering—Rules that restrict or allow specific HTTP methods such as GET, POST, PUT, DELETE, etc. Some attacks may exploit methods like PUT to upload malicious content. For example, a static rule might block any PUT requests if the application does not require file uploads.

(5) Input Validation Rules—These rules ensure that the data sent by users via input fields meets certain criteria, preventing attacks like SQL injection or remote code execution. For example, a rule might block requests where an input field contains suspicious characters like ', ", :, or SQL-specific commands like UNION.

(6) Cookie and Session Validation Rules—These rules inspect cookies and session data to prevent session hijacking and tampering. For example, a static rule might ensure that all cookies include the HttpOnly and Secure flags to prevent client-side access to sensitive session information.

(7) Header Inspection Rules—Rules that inspect and validate HTTP headers to detect spoofing, malicious redirects, or data leakage attempts. For example, the Host or Referrer headers can be validated to ensure requests are coming from legitimate sources.

(8) File Upload Rules—These rules are designed to inspect file uploads to ensure they do not contain malicious content such as malware, scripts, or other executable files. For example, a static rule might block all .php or .exe files from being uploaded to prevent remote code execution.

(9) Rate Limiting and Throttling Rules—Static security profiles may include rules to limit the number of requests from a single IP address or session over a given time period, helping to mitigate DDoS or brute-force attacks. For example, a rule could be set to block an IP address after 100 failed login attempts within a 10-minute window.

The WAF agent 402 applies these static security profiles by examining each incoming HTTP/HTTPS request. For each request, the WAF agent performs the following actions:

(1) Pattern Matching: The WAF agent 402 compares the request with the patterns defined in the static security profiles. It checks URLs, input fields, headers, and other traffic components against known attack signatures, regex rules, and validation patterns.

(2) Policy Enforcement: When a match is found, the agent enforces the appropriate action based on the configured policy. This could include blocking the request, logging the event for future analysis, alerting the administrator or security team, or allowing the request if it's deemed legitimate.

(3) Updating and Maintenance: Conventionally, security profiles are static and do not dynamically adapt to changing traffic, but they can be periodically updated to reflect the latest known attack signatures and vulnerabilities (e.g., the latest Open Web Application Security Project (OWASP) Top 10 web application risks). Administrators can also fine-tune the static rules if needed to better match the specific security requirements of their web application.

§ 4.3 Log Data

With the cloud 120 as well as any of the network configurations 100A, 100B, 100C, the WAF agents 402 can provide a rich set of statistics, logs, history, audit trails, and the like related to various endpoint 102 transactions. Generally, this rich set of data can represent activity by the WAF agent 402. This information can be for WAF agents 402 of a company, organization, etc., and analyzing this data can provide a wealth of information as well as training data for machine learning models.

A key aspect here is that the cybersecurity monitoring by the distributed WAF agents 402 is rich and provides a wealth of information to determine various assessments of cybersecurity. Of note, with various cybersecurity monitoring techniques via the network configurations 100A, 100B, 100C, as well as with other network configurations, the raw WAF data 412 is a rich repository of active web threats, namely what controls or rules for a security profile are being hit, where they are, what users or endpoints 102 are being affected, what companies or tenants are being affected, and the like. Again, as described herein, the selection of an optimal security profile for the WAF agent 402 is an optimization problem, and the raw WAF data 412 provides real-time insight that can solve this optimization problem.

§ 4.4 Example Screenshots for Selecting WAF Security Profiles

FIGS. 6-11 are screenshots associated with a centralized WAF management platform for configuring WAF security profiles for the WAF agents 402. The centralized WAF management platform can be implemented via the cloud 120, as well as include the WAF security profile generation system 410. The centralized WAF management platform can be multi-tenant, supporting multiple tenants, each have users and associated endpoints 102 with the WAF agents 402 include thereon. In this embodiment, there are four sets of security profiles—
(1) OWASP Predefined Controls
(2) Custom Controls
(3) ThreatLabz ("Zero-day") Controls
(4) WebSocket Controls OWASP Predefined Controls focus on defending against the most common vulnerabilities identified in the OWASP Top 10, such as SQL injection and cross-site scripting, offering broad, standardized protection. Custom Controls allow organizations to create custom rules tailored to their specific applications, addressing unique threats and compliance needs through features like URL filtering and IP whitelisting. Zero-day Controls safeguard against unknown, unpatched vulnerabilities by using anomaly detection, behavioral analysis, and machine learning to identify suspicious activities before they are publicly documented. Lastly, WebSocket Controls protect applications that use WebSockets for real-time communication by inspecting message content, validating connections, and preventing protocol-based attacks. Together, these controls provide a layered defense, ensuring that web applications are secure against both known and emerging threats.

Figure 6:
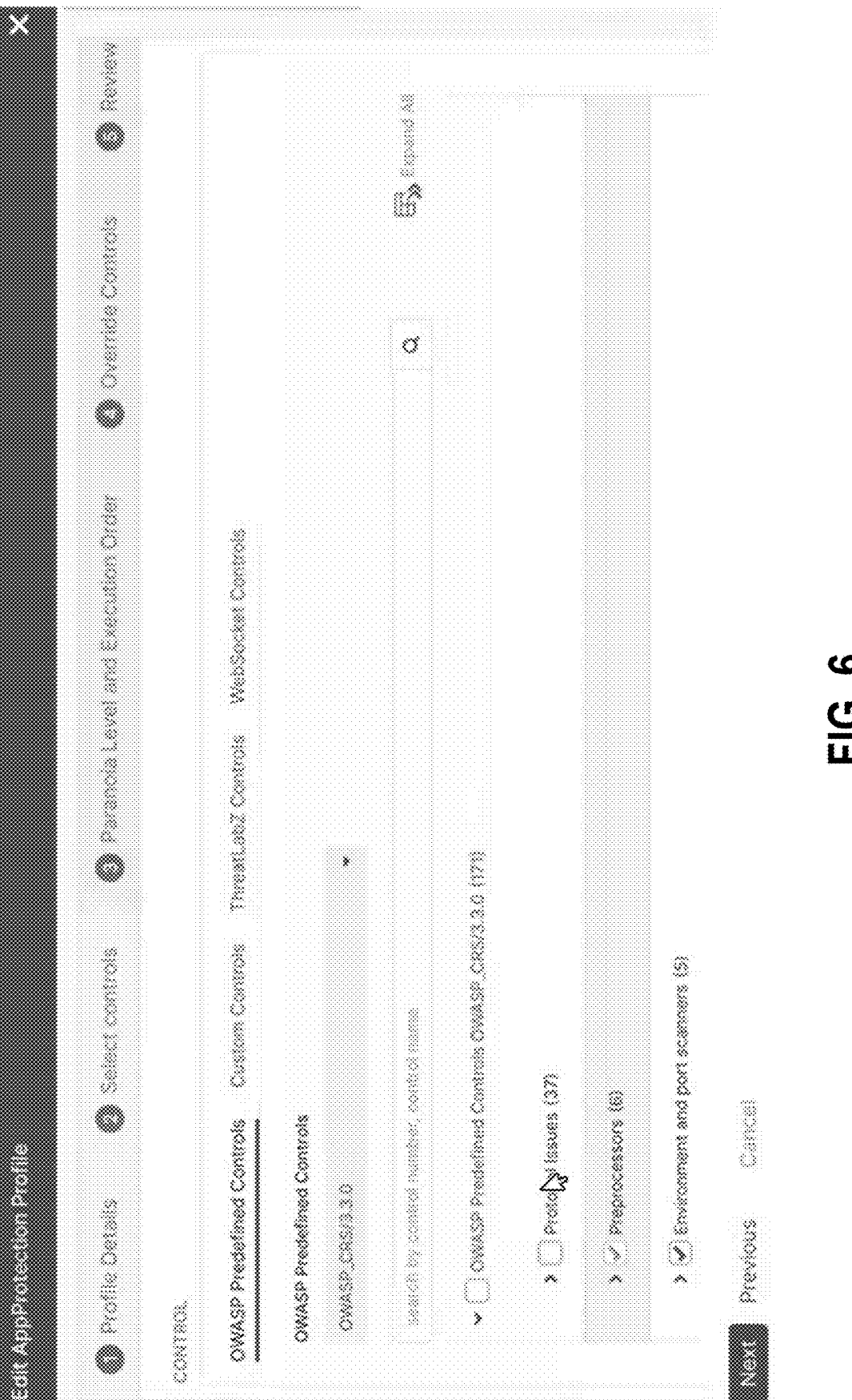
Figure 7:
Figure 8:
Figure 9:
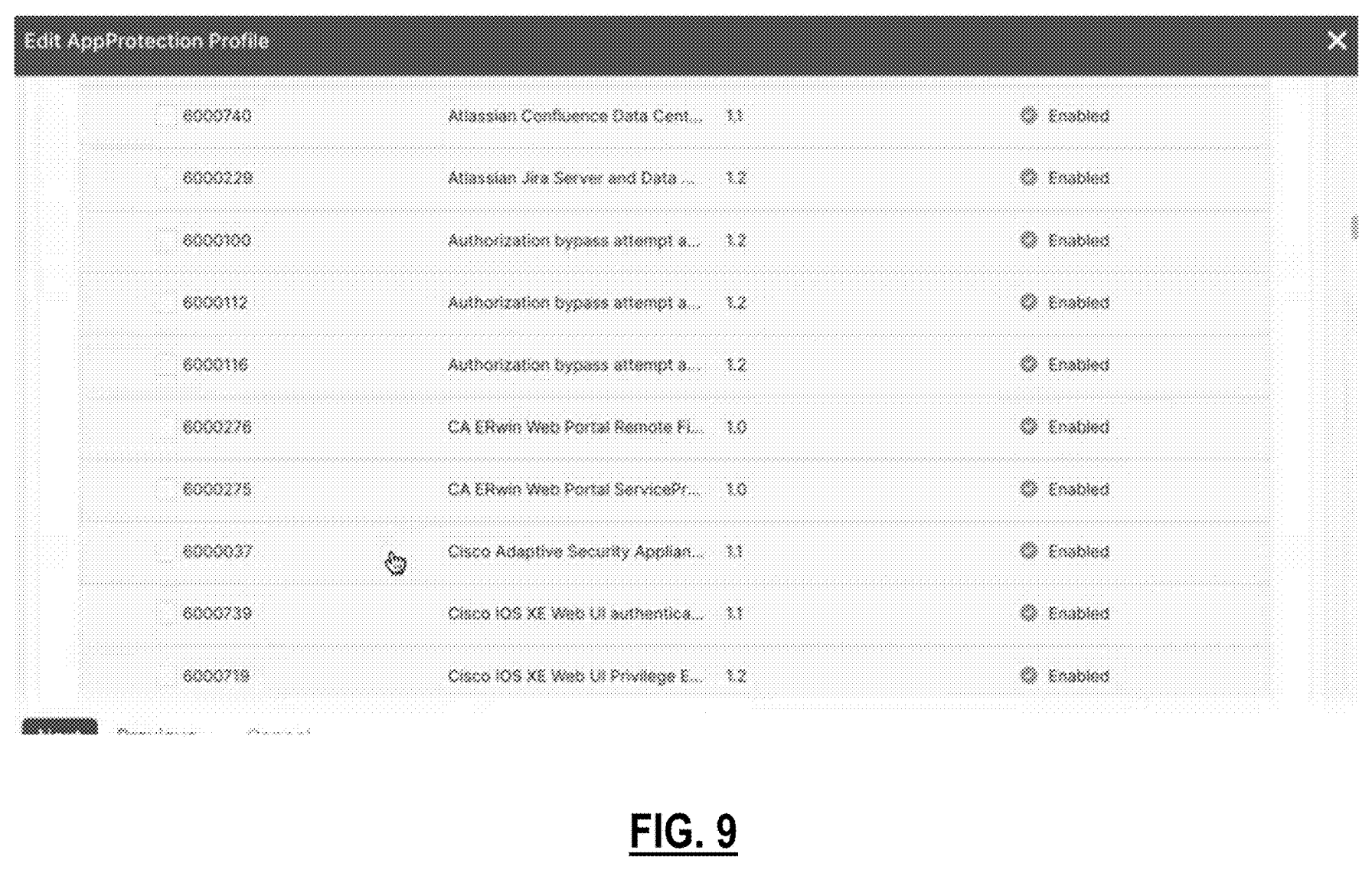
Figure 10:
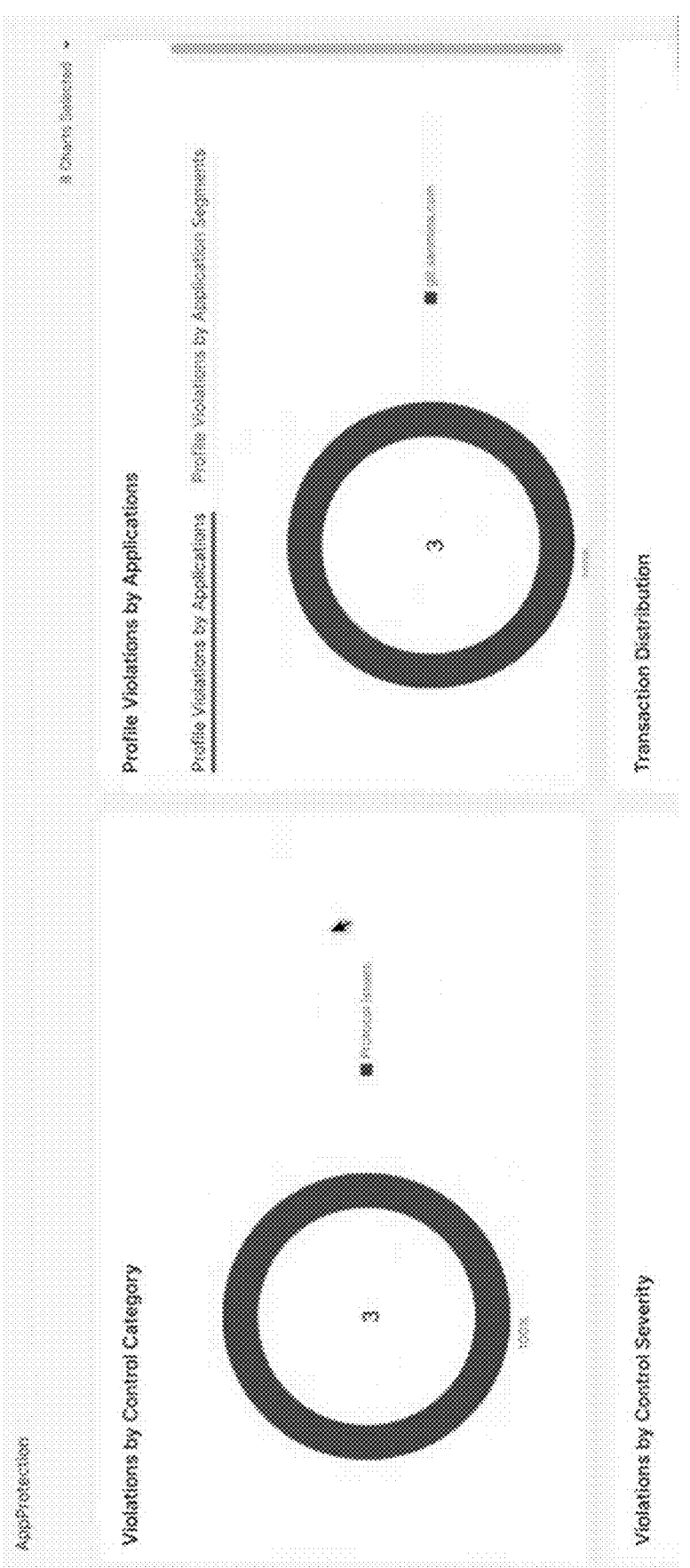
Figure 11:
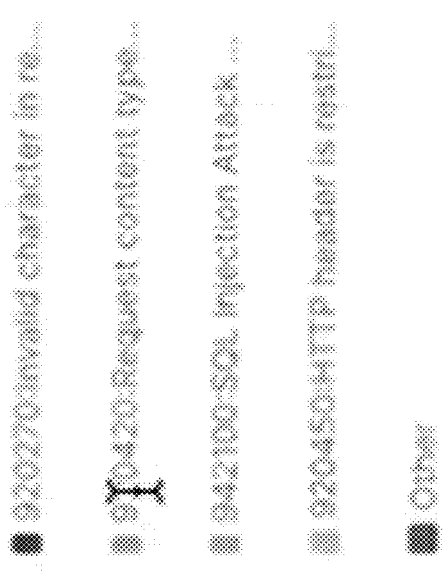
Figure 11:
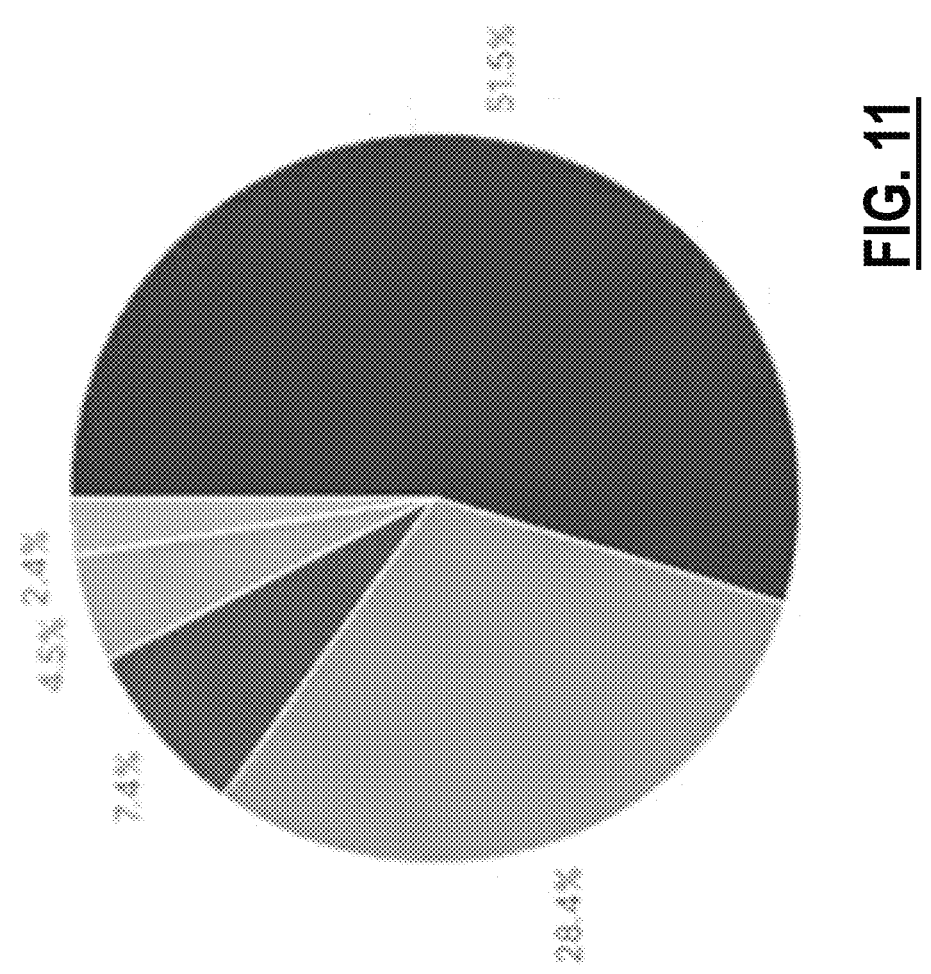

FIG. 6 illustrates a screenshot of selecting OSWAP Predefined Controls. FIG. 7 illustrates another screenshot of selecting OSWAP Predefined Controls. FIG. 8 illustrates a screenshot of selecting Zero-day Controls. FIG. 9 illustrates another screenshot of selecting Zero-day Controls. FIG. 10 illustrates a screenshot of a visualization of violations of select security profiles. FIG. 11 illustrates another screenshot of a visualization of violations of select security profiles.

As described herein, each selection can be referred to as a control, and this is a rule, pattern, signature, etc. that is applied. Collectively, the selected controls refers to a given security profile for a given user, group of users, tenant, etc. Note, there can be thousands of selections for the controls.

§ 4.5 WAF Security Profile Generation

Again, the WAF agent 402 applies rules or controls either in the cloud or potentially on the customer's premises, depending on the setup. The WAF agent 402 processes customer traffic, scanning for predefined patterns (like specific attack signatures), using rules that the customer can select. This ensures that any incoming traffic is inspected for potential threats, such as malware or exploit attempts. There are challenges to having customers, IT, administrators, etc. deciding what rules or controls to enable for the WAF agent 402 to inspect incoming traffic to detect and block security threats. Customers often enable too many rules simultaneously because they believe this will provide maximum security. However, enabling too many rules can overwhelm the WAF agent 402, leading to performance degradation or even crashes. This occurs because filtering too many packets under multiple rules consumes excessive computational resources, which slows down the application and could potentially cause a crash. The customer's belief that "more rules equal better security" can lead to inefficient use of resources, ultimately hampering performance.

Referring back to FIG. 5, to address this issue, the present disclosure includes an optimization strategy using machine learning in the WAF security profile generation system 410. The WAF agents 402 collects data about how many times specific rules are triggered (i.e., how many matches occur) and how long it takes to process each rule. This is the raw WAF data 412, and it is stored in the cloud 120 and normalized and sanitized 414 and then used to train a machine learning algorithm 416. The goal of this machine learning algorithm 416 is to provide intelligent profile recommendations. These profiles would optimize the set of rules based on the customer's specific traffic patterns, region, and threat landscape. This is referred to as an optimal profile for individual tenants 420. The term optimal does not necessarily mean the "best" but rather one that is ideal considering factors such as latency, computer power, current threat landscape, etc. Also, the optimal profile can be for an individual user, a group of users, all users for a tenant, all tenants, etc.

For example, the WAF security profile generation system 410 could recommend enabling rules that match the most common attacks in a specific geographic region currently while minimizing the CPU usage required to enforce these rules. The machine learning algorithm 416 could balance security needs (based on historical attack data) with performance efficiency, ensuring that the WAF agents 402 are not overwhelmed. The dynamic optimal profile would be updated hourly, daily, or weekly, adapting to changing threat patterns and offering tailored rule sets for individual customers.

Also, considering a global deployment across different regions gives the WAF security profile generation system 410 valuable information about the nature of attacks in specific areas. The WAF security profile generation system 410 could leverage this geographic data to further refine rule recommendations, enabling rules that are most relevant to a customer's region and deactivating those that are less applicable, thus ensuring both security and performance.

This machine learning-driven solution would help answer a key customer question: "Which rules should I enable?" Instead of customers manually deciding, the WAF security profile generation system 410 would use real-time data and machine learning to offer optimal rule sets that provide the best balance between security and resource efficiency. This would prevent system crashes caused by over-enabling rules and ensure faster packet filtering, reduced resource consumption, and improved overall security by using an adaptive and intelligent approach.

The input data for the WAF security profile generation system 410 includes the raw WAF data 412 which is normalized and sanitized 414 for the machine learning algorithm 416. The input data includes, e.g., specific rule hits over a time period, additional latency and compute power for application of a given rule, geographic location of specific rule hits over the time period, number of recent threats block or detected by a given rule, some quantification of threat impact of each rule, and other information that could determine or be related to the effectiveness of a given rule.

Normalizing and sanitizing raw data are crucial steps in preparing data for machine learning (ML) algorithms. Normalization involves adjusting data to a consistent scale, ensuring that features with different units or ranges don't disproportionately influence the model. Techniques like min-max scaling and z-score normalization help standardize the data for accurate comparison. Sanitization focuses on cleaning the data by removing errors, handling missing values, filtering outliers, and eliminating invalid or malicious inputs, ensuring that the data is accurate, relevant, and safe for processing. Both processes improve model accuracy, efficiency, and security, making them essential for successful machine learning outcomes.

The normalized and sanitized data 414 can be fed into the machine learning algorithm 416 to optimize the selection of rules for maximum threat protection while minimizing latency and resource usage. The algorithm analyzes this data to identify patterns and relationships, helping determine which rules are most effective at blocking threats in different regions and environments while consuming the least resources. By continuously learning from new data, the model can dynamically adjust and recommend the optimal set of rules, ensuring that the WAF agent 402 provides strong security without overwhelming system performance.

In an example embodiment, the machine learning algorithm 416 uses various inputs, including specific rule hits, latency and compute power data, geographic location of rule hits, number of threats blocked, and the threat impact of each rule, to determine the optimal rule selection for a Web Application Firewall (WAF). Here's an example (1) Specific Rule Hits Over Time—The machine learning algorithm 416 analyzes the frequency of each rule being triggered over a given time period, identifying which rules are consistently effective in detecting and blocking threats. Higher frequency of rule hits can indicate that a rule is essential for current protection, particularly in regions experiencing higher threat activity.

(2) Additional Latency and Compute Power—Latency and resource usage are critical for system performance. The machine learning algorithm 416 evaluates the cost of applying each rule in terms of how much latency and compute power it introduces. The goal is to select rules that maximize security without excessively degrading performance. For example, if two rules offer similar protection but one incurs much less latency, the machine learning algorithm 416 will prioritize the lower-cost rule.

(3) Geographic Location of Rule Hits—The machine learning algorithm 416 uses geographic data to tailor rule selection based on regional threat patterns. If certain regions experience specific types of attacks, the machine learning algorithm 416 can suggest enabling rules that are most effective in those areas. For example, if SQL injection attacks are more common in a specific geographic location, the WAF security profile generation system 410 can prioritize rules that address that threat for users in that region.

(4) Number of Recent Threats Blocked—The machine learning algorithm 416 monitors the effectiveness of each rule based on the number of threats it has successfully blocked. Rules that block a high volume of threats over time are weighted more heavily in the selection process, while rules with little recent impact may be deprioritized unless they protect against high-severity threats.

(5) Threat Impact Quantification—Not all threats have the same impact. The machine learning algorithm 416 quantifies the potential damage or severity of threats blocked by each rule, weighing rules that block high-impact attacks (such as data breaches or ransomware). This ensures that the machine learning algorithm 416 does not just prioritize based on frequency but also takes the seriousness of the threat into account.

(6) Other Information Related to Rule Effectiveness—Additional inputs could include contextual factors such as traffic patterns, time of day, or application-specific behaviors that influence the effectiveness of certain rules. For instance, a rule might only be relevant during peak traffic times or for specific types of users.

The machine learning algorithm 416 processes this data 412, 414 to generate a ranking of rules, prioritizing those that provide maximum security with minimal resource and latency overhead. It does this by identifying correlations and patterns within the data 412, 414, such as:

(a) Which rules are most frequently hit in certain regions.
(b) Which rules offer the highest protection with the least compute power.
(c) Which rules are most effective against high-impact threats.

The above description focused on the goals of maximizing threat protection while minimizing latency and compute resources for illustration purpose. Thos skilled in the art will appreciate the WAF security profile generation system 410 can work with different objectives to come up with an optimal security profile.

§ 4.6 Example of Machine Learning Algorithms

Random Forests: A decision-tree-based algorithm that can evaluate the importance of each rule by creating decision paths based on rule hits, latency, and threat impact. Random forests can handle multiple inputs and prioritize rules based on performance across many decision trees.

Gradient Boosting Machines (GBM): This algorithm builds an ensemble of weak models (typically decision trees), gradually improving predictions by focusing on the most relevant rules and minimizing errors. GBM can identify which rules provide the best security/performance trade-off.

K-Means Clustering: This algorithm can group similar rules based on their effectiveness, compute cost, and threat detection frequency. It clusters rules that behave similarly, allowing the model to recommend clusters of optimal rules for different regions or environments.

Reinforcement Learning: A dynamic learning algorithm where the model "learns" from continuous interaction with the environment (i.e., the WAF system). It rewards the selection of rules that improve protection and performance and penalizes those that increase latency without providing meaningful protection. Over time, the model improves its selection strategy.

Neural Networks: A deep learning model that can handle complex relationships in data. Neural networks can learn the nonlinear relationships between rule hits, latency, threat impact, and other factors to make highly accurate predictions on optimal rule selection.

§ 4.7 Example Application

If a specific region is experiencing a surge in SQL injection attacks, and the model detects that a rule addressing SQL injection has a high hit rate and low latency cost, it will prioritize enabling that rule for users in that region. Meanwhile, rules that are rarely triggered or add unnecessary latency could be deprioritized, ensuring the system remains efficient while maintaining strong protection. By analyzing all these inputs, the machine learning algorithm 416 provides dynamic, optimal rule selection, ensuring the WAF security profile generation system 410 delivers maximum security with minimal performance impact.

§ 4.8 Decoy and Static WAF Agents

In the network 400, not all of the WAF agents 402 necessarily need to have their security profiles controlled by the WAF security profile generation system 410. That is, some of the WAF agents 402 can be deployed for the purposes of obtaining the raw WAF data 412. For example, a first set of WAF agents 402 can run with static profiles so they can generate data that would not otherwise be generated by dynamic profiles. The static profiles can be different, for different WAF agents 402, and for different locations. A second set of WAF agents 402 can run allowing all traffic, but generating data on effectiveness of various rules to be configured in security profiles.

§ 5.0 Process

FIG. 12 illustrates a flowchart of a process 500 for intelligent dynamic security profiles for Web Application Firewalls (WAFs). The process 500 contemplates implementation as a method having steps, via an apparatus configured to implement the steps, as a cloud service or SaaS configured to implement the steps, and as a non-transitory computer-readable medium storing instructions that, when executed, cause one or more processors to implement the steps.

The steps include receiving raw data related to operation of a plurality of Web Application Firewall (WAF) agents, wherein the plurality of WAF agents are distributed across multiple tenants globally over the Internet (step 502); normalizing and sanitizing the raw data (step 504); analyzing the normalized and sanitized data with a machine learning algorithm to determine prioritization of rules in a given WAF agent based on the raw data and an objective (step 506); and providing a security profile to the given WAF agent where the security profile includes a selection of the rules based on the prioritization and the objective (step 508).

In an embodiment, the objective is to maximize threat detection and minimize latency and compute resources. The raw data can include specific rule hits over a time period, additional latency and compute power for application of a given rule, geographic location of specific rule hits over the time period, number of recent threats block or detected by a given rule, and quantification of threat impact of each rule, In an embodiment, the raw data includes geographic location of specific rule hits over a time period, and wherein the prioritization is based on a geographic location of the given WAF agent.

The machine learning algorithm is trained to perform the prioritization based on the objective. The machine learning algorithm can use one of a Random Forest, Gradient Boosting Machines, K-Means Clustering, Reinforcement Learning, and Neural Networks. The objective can include one or more of location, latency, and usage. The plurality of WAF agents can include a set having statically configured security profiles for generating corresponding raw WAF data for use in the analyzing. The plurality of WAF agents can include a set having security profiles for allowing all traffic for generating corresponding raw WAF data for use in evaluating effectiveness of various rules.

§ 6.0 Processing Circuitry and Non-Transitory Computer-Readable Mediums

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); Programmable Logic Device (PLD), or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each equipped with processing circuitry. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

§ 7.0 Conclusion

In this disclosure, including the claims, the phrases "at least one of" or "one or more of" when referring to a list of items mean any combination of those items, including any single item. For example, the expressions "at least one of A, B, or C," "at least one of A, B, and C," "one or more of A, B, or C," and "one or more of A, B, and C" cover the possibilities of: only A, only B, only C, a combination of A and B, A and C, B and C, and the combination of A, B, and C. This can include more or fewer elements than just A, B, and C. Additionally, the terms "comprise," "comprises," "comprising," "include," "includes," and "including" are intended to be open-ended and non-limiting. These terms specify essential elements or steps but do not exclude additional elements or steps, even when a claim or series of claims includes more than one of these terms.

Although operations, steps, instructions, blocks, and similar elements (collectively referred to as "steps") are shown or described in the drawings, descriptions, and claims in a specific order, this does not imply they must be performed in that sequence unless explicitly stated. It also does not imply that all depicted operations are necessary to achieve desirable results. In the drawings, descriptions, and claims, extra steps can occur before, after, simultaneously with, or between any of the illustrated, described, or claimed steps. Multitasking, parallel processing, and other types of concurrent processing are also contemplated. Furthermore, the separation of system components or steps described should not be interpreted as mandatory for all implementations; also, components, steps, elements, etc. can be integrated into a single implementation or distributed across multiple implementations.

While this disclosure has been detailed and illustrated through specific embodiments and examples, it should be understood by those skilled in the art that numerous variations and modifications can perform equivalent functions or achieve comparable results. Such alternative embodiments and variations, even if not explicitly mentioned but that achieve the objectives and adhere to the principles disclosed herein, fall within the spirit and scope of this disclosure. Accordingly, they are envisioned and encompassed by this disclosure and are intended to be protected under the associated claims. In other words, the present disclosure anticipates combinations and permutations of the described elements, operations, steps, methods, processes, algorithms, functions, techniques, modules, circuits, and so on, in any conceivable order or manner-whether collectively, in subsets, or individually-thereby broadening the range of potential embodiments.

What is claimed is:

1. A method comprising steps of:
 receiving raw data related to operation of a plurality of Web Application Firewall (WAF) agents, wherein the plurality of WAF agents are distributed across multiple tenants globally over the Internet;
 normalizing and sanitizing the raw data;
 analyzing the normalized and sanitized data with a machine learning algorithm to determine prioritization of rules in a given WAF agent based on the raw data and an objective; and
 providing a security profile to the given WAF agent where the security profile includes a selection of the rules based on the prioritization and the objective,
 wherein the raw data includes specific rule hits over a time period, additional latency and compute power for application of a given rule, geographic location of specific rule hits over the time period, number of recent threats block or detected by a given rule, and quantification of threat impact of each rule.

2. The method of claim 1, wherein the objective is to maximize threat detection and minimize latency and compute resources.

3. The method of claim 1, wherein the prioritization is based on a geographic location of the given WAF agent.

4. The method of claim 1, wherein the machine learning algorithm is trained to perform the prioritization based on the objective.

5. The method of claim 1, wherein the machine learning algorithm uses one of a Random Forest, Gradient Boosting Machines, K-Means Clustering, Reinforcement Learning, and Neural Networks.

6. The method of claim 1, wherein the objective includes one or more of location, latency, and usage.

7. The method of claim 1, wherein the plurality of WAF agents include a set having statically configured security profiles for generating corresponding raw WAF data for use in the analyzing.

8. The method of claim 1, wherein the plurality of WAF agents include a set having security profiles for allowing all traffic for generating corresponding raw WAF data for use in evaluating effectiveness of various rules.

9. A non-transitory computer-readable medium comprising instructions that, when executed, cause one or more processors to perform steps of:
 receiving raw data related to operation of a plurality of Web Application Firewall (WAF) agents, wherein the plurality of WAF agents are distributed across multiple tenants globally over the Internet;
 normalizing and sanitizing the raw data;
 analyzing the normalized and sanitized data with a machine learning algorithm to determine prioritization of rules in a given WAF agent based on the raw data and an objective; and
 providing a security profile to the given WAF agent where the security profile includes a selection of the rules based on the prioritization and the objective,
 wherein the raw data includes specific rule hits over a time period, additional latency and compute power for application of a given rule, geographic location of specific rule hits over the time period, number of recent threats block or detected by a given rule, and quantification of threat impact of each rule.

10. The non-transitory computer-readable medium of claim 9, wherein the objective is to maximize threat detection and minimize latency and compute resources.

11. The non-transitory computer-readable medium of claim 9, wherein the prioritization is based on a geographic location of the given WAF agent.

12. The non-transitory computer-readable medium of claim 9, wherein the machine learning algorithm is trained to perform the prioritization based on the objective.

13. The non-transitory computer-readable medium of claim 9, wherein the machine learning algorithm uses one of a Random Forest, Gradient Boosting Machines, K-Means Clustering, Reinforcement Learning, and Neural Networks.

14. The non-transitory computer-readable medium of claim 9, wherein the objective includes one or more of location, latency, and usage.

15. The non-transitory computer-readable medium of claim 9, wherein the plurality of WAF agents include a set having statically configured security profiles for generating corresponding raw WAF data for use in the analyzing.

16. The non-transitory computer-readable medium of claim 9, wherein the plurality of WAF agents include a set having security profiles for allowing all traffic for generating corresponding raw WAF data for use in evaluating effectiveness of various rules.

17. A Web Application Firewall (WAF) security profile generation system comprising circuitry configured to:

receive raw data related to operation of a plurality of WAF agents, wherein the plurality of WAF agents are distributed across multiple tenants globally over the Internet;

normalize and sanitize the raw data;

analyze the normalized and sanitized data with a machine learning algorithm to determine prioritization of rules in a given WAF agent based on the raw data and an objective; and provide a security profile to the given WAF agent where the security profile includes a selection of the rules based on the prioritization and the objective, wherein the raw data includes specific rule hits over a time period, additional latency and compute power for application of a given rule, geographic location of specific rule hits over the time period, number of recent threats block or detected by a given rule, and quantification of threat impact of each rule.

\* \* \* \* \*